US008976648B2

(12) United States Patent
Simen et al.

(10) Patent No.: US 8,976,648 B2
(45) Date of Patent: Mar. 10, 2015

(54) METHOD AND APPARATUS FOR MANAGING LOAD ON SERVICE DEVICES IN A COMMUNICATION NETWORK

(75) Inventors: Silviu Florian Simen, Mississauga (CA); Jason William Tackaberry, Waterloo (CA); Samuel David Glazer, New York, NY (US); Yusof Ganji, Milton (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/571,089

(22) Filed: Aug. 9, 2012

(65) Prior Publication Data

US 2014/0043968 A1 Feb. 13, 2014

(51) Int. Cl.
*H04J 1/16* (2006.01)
*H04L 12/803* (2013.01)
*H04L 12/911* (2013.01)
*H04L 12/801* (2013.01)
*H04L 29/06* (2006.01)

(52) U.S. Cl.
CPC .............. *H04L 47/122* (2013.01); *H04L 47/70* (2013.01); *H04L 47/10* (2013.01); *H04L 65/1063* (2013.01); *H04L 65/105* (2013.01)
USPC ........................................................ 370/229

(58) Field of Classification Search
None
See application file for complete search history.

(56) References Cited

U.S. PATENT DOCUMENTS

| | | | |
|---|---|---|---|
| 6,363,401 B2 * | 3/2002 | Yahya et al. ............................ 1/1 |
| 6,496,504 B1 * | 12/2002 | Malik ............................ 370/390 |
| 6,928,051 B2 | 8/2005 | Butt et al. |
| 7,876,766 B1 | 1/2011 | Atkins et al. |
| 2004/0057445 A1 | 3/2004 | LeBlanc |
| 2005/0131986 A1 * | 6/2005 | Haagens et al. .............. 709/201 |
| 2005/0182960 A1 | 8/2005 | Petry et al. |
| 2005/0267941 A1 | 12/2005 | Addante et al. |
| 2005/0278493 A1 * | 12/2005 | Lin et al. ........................ 711/162 |
| 2007/0159965 A1 * | 7/2007 | Kopf et al. .................... 370/229 |
| 2008/0025307 A1 * | 1/2008 | Preiss et al. ................... 370/392 |
| 2008/0285447 A1 | 11/2008 | Yamasaki |
| 2010/0046368 A1 | 2/2010 | Kaempfer et al. |
| 2011/0205956 A1 * | 8/2011 | Inada ............................. 370/315 |
| 2012/0155627 A1 | 6/2012 | Nair et al. |
| 2012/0159514 A1 | 6/2012 | Sigalov et al. |
| 2012/0163205 A1 | 6/2012 | Zhang et al. |
| 2014/0067908 A1 | 3/2014 | Feng et al. |

OTHER PUBLICATIONS

European Patent Office, Extended European Search Report issued in European Application No. 12190329.8, dated Jan. 28, 2013, 7 pages.
Zhang Huangbin, iRedMail—Free, Pen Source Email Server Solution, http://www.iredmail.org/features.html, Published Jan. 9, 2010, Accessed: Jun. 27, 2012, 4 pages.

(Continued)

*Primary Examiner* — Kibrom T Hailu
(74) *Attorney, Agent, or Firm* — Hanley, Flight & Zimmerman, LLC.

(57) ABSTRACT

A method, system and apparatus for managing load on service devices in a communication network are provided. At a processor of a relay device, it is determined that the service devices are available after being unavailable, the relay device comprising a communication interface and a processor for relaying messages, via the communication interface, between a communication device and the service devices. In response, the processor blocks incoming messages associated with a subset of the service devices, the incoming messages from the at least one communication device.

10 Claims, 10 Drawing Sheets

(56) References Cited

OTHER PUBLICATIONS

European Patent Office, "Extended European Search Report," issued in connection with European Application No. 12191063.2, dated Nov. 26, 2013, 5 pages.

United States Patent and Trademark Office, Office Action issued in connection with U.S. Appl. No. 13/571,083, dated May 9, 2014, 28 pages.

United States Patent and Trademark Office, Notice of Allowance issued in connection with U.S. Appl. No. 13/571,083, dated Sep. 4, 2014, 21 pages.

United States Patent and Trademark Office, Notice of Allowance issued in connection with U.S. Appl. No. 13/571,083, dated Nov. 21, 2014, 36 pages.

* cited by examiner

US 8,976,648 B2

METHOD AND APPARATUS FOR MANAGING LOAD ON SERVICE DEVICES IN A COMMUNICATION NETWORK

FIELD

The specification relates generally to relays, and specifically to a method, system and apparatus for managing load on service devices in a communication network.

BACKGROUND

When a service device, and/or an associated relay, in a communication network goes offline, messages associated with the service device can accumulate in the communication network. When the service device, and/or the associated relay, comes back online, communication devices attempting to connect with the service device can overwhelm the service device and/or the associated relay due to a large amount of accumulated traffic and/or a large number of communication devices attempting to connect thereto.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
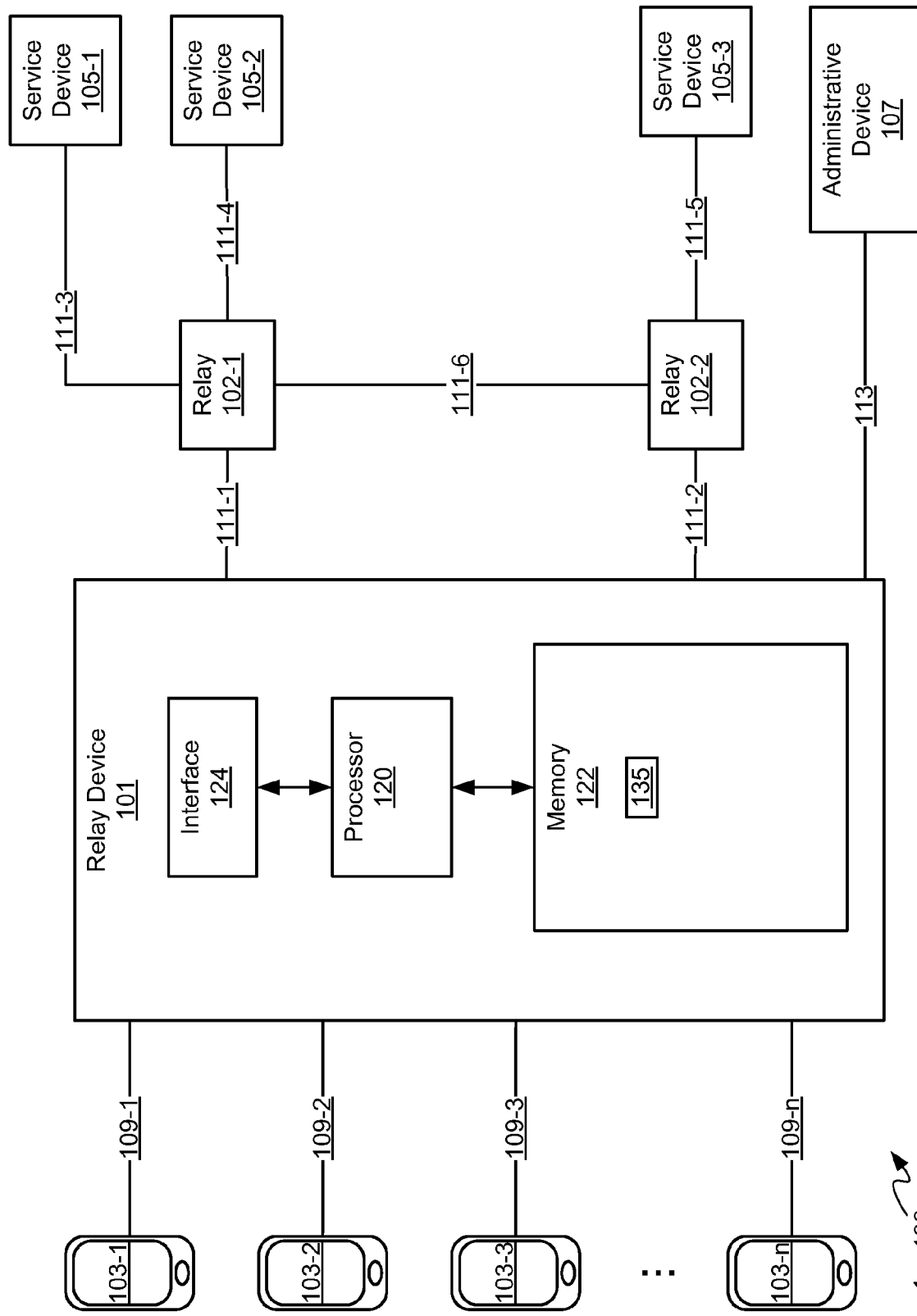
FIG. 1 depicts a system for managing load on service devices in a communication network, according to non-limiting implementations.

An aspect of the specification provides a relay device comprising: a communication interface and a processor for relaying messages, via the communication interface, between a communication device and service devices, the processor enabled to: determine that the service devices are available after being unavailable; and, in response, block incoming messages associated with a subset of the service devices, the incoming messages from the communication device.

The processor can be further enabled to block incoming messages associated with the subset of the service devices by one or more of: dropping the incoming messages; transmitting the incoming messages back to the communication device acknowledging receipt of the incoming messages; and, sending respective notifications back to the communication device that the incoming messages have been rejected.

Each of the incoming messages can comprise a respective identifier associated with a respective service provided by one or more of the service devices, and wherein the processor can be further enabled to determine that the incoming messages are associated with the subset via the respective identifiers.

The processor can be further enabled to stop blocking the incoming messages associated with one or more of the subset of service devices after receiving one or more indications to relay messages associated with the one or more of the subset of service devices. One or more indications can be received from an administrative device. One or more indications can be respectively associated with respective service devices in the subset. The processor can be further enabled to stop blocking the incoming messages associated with one or more of the subset of service devices after receiving a plurality of indications to relay messages respectively associated with the each of the service devices in the subset, the plurality of indications received one after the other from an administrative device.

The processor can be further enabled to stop blocking the incoming messages associated with one or more of the subset of service devices in a priority order of the subset of service devices.

The processor can be further enabled to stop blocking respective incoming messages associated with a given service device of the subset of service devices when a volume of messages associated with the given service device meets a threshold condition.

The relay device can further comprise at least one of a router, a relay, a switch and a firewall.

Another aspect of the specification provides a method comprising: determining, at a processor of a relay device, that the service devices are available after being unavailable, the relay device comprising a communication interface and the processor for relaying messages, via the communication interface, between a communication device and the service devices; and, in response, blocking, via the processor, incoming messages associated with a subset of the service devices, the incoming messages from the communication device.

The method can further comprise blocking incoming messages associated with the subset of the service devices by one or more of: dropping the incoming messages; transmitting the incoming messages back to the communication device acknowledging receipt of the incoming messages; and, sending respective notifications back to the communication device that the incoming messages have been rejected.

Each of the incoming messages can comprise a respective identifier associated with a respective service provided by one or more of the service devices, and wherein the method further comprises determining that the incoming messages are associated with the subset via the respective identifiers.

The method can further comprise stopping blocking the incoming messages associated with one or more of the subset of service devices after receiving one or more indications to relay messages associated with the one or more of the subset of service devices. One or more indications can be received from an administrative device. One or more indications can be respectively associated with respective service devices in the subset. The method can further comprise stopping blocking the incoming messages associated with one or more of the subset of service devices after receiving a plurality of indications to relay messages respectively associated with the each of the service devices in the subset, the plurality of indications received one after the other from an administrative device.

The method can further comprise stopping blocking the incoming messages associated with one or more of the subset of service devices in a priority order of the subset of service devices.

The method can further comprise stopping blocking respective incoming messages associated with a given service device of the subset of service devices when a volume of messages associated with the given service device meets a threshold condition.

Yet a further aspect of the specification provides a computer program product, comprising a non-transitory computer usable medium having a computer readable program code adapted to be executed to implement a method comprising: determining, at a processor of a relay device, that the service devices are available after being unavailable, the relay device comprising a communication interface and a processor for relaying messages, via the communication interface, between a communication device and the service devices; and, in response, blocking incoming messages associated with a subset of the service devices, the incoming messages from the at least one communication device. The computer program product can comprise a non-transitory computer program product.

FIG. 1 depicts a system 100 comprising a relay device 101, a first relay 102-1, a second relay 102-2, a plurality of communication devices 103-1, 103-2, 103-3 . . . 103-$n$, service devices 105-1, 105-2, 105-3, and an administrative device 107 according to non-limiting implementations. Relay device 101 will interchangeably be referred to hereafter as device 101. Relays 102-1, 102-2 will interchangeably be referred to hereafter, collectively, as relays 102 and generically as a relay 102. Communications devices 103-1, 103-2, 103-3 . . . 103-$n$ will be interchangeably referred to hereafter, collectively as devices 103, and generically as a device 103. Service devices 105-1, 105-2, 105-3 will be interchangeably referred to hereafter as, collectively, service devices 105, and generically as a service device 105. It is yet further appreciated that device 101 can establish communications with each device 103 via a respective link 109-1, 109-2, 109-3 . . . 109-$n$ (which will interchangeably be referred to hereafter, collectively, as links 109 and generically as a link 109). Device 101, relays 102 and service devices 105 are all in communication via respective links 111-1, 111-2, 111-3, 111-4, 111-5, 111-6 (which will interchangeably be referred to hereafter, collectively, as links 111 and generically as a link 111). Device 101 and administrative device 107 are in communication via a link 113.

Device 101 further comprises a processor 120 interconnected with a memory 122 and a communication interface 124. Communication interface 124 will interchangeably be referred to hereafter as an interface 124. Memory 122 further stores an application 135 which, when processed by processor 120, enables processor 120 to control access of devices 103 to service devices 105, as described in further detail below. As such, device 101 can comprise a firewall provided via processing of application 135, and specifically an application layer firewall as firewall services are provided by processing application 135.

It is further appreciated that system 100 can comprise any suitable number of devices 103, including hundreds to thousands to millions of devices. For example, system 100 can comprise handheld devices that are associated with accounts managed by an entity that operates at least a portion of a communication network (e.g. a communication network represented by at least a portion of links 109, a communication network associated with device 101, and the like). For example, a user of device 103 can subscribe to services provided by the entity. As such, the entity can comprise a carrier operating at least a portion of a network. As carriers are generally enabled to provide services to hundreds of thousands and even millions of subscribers, the number of devices in system 100 can be commensurate with a number of devices operated by a carrier.

Device 101, relays 102 and service devices 105 are generally appreciated to be components of a communications network; hence, associated network infrastructure can comprise at least relays 102 and service devices 105, with device 101 acting as a front end component and/or a front end device and/or as a gateway device to the network infrastructure. As such, device 101 is generally enabled to control access of devices 103 to the network infrastructure, and/or service devices 105, as will be described hereafter. While only one front end device 101 is depicted in FIG. 1, other implementations comprise more than one front end device acting as a gateway for subsets of devices 103.

It is further appreciated that relays 102 are generally enabled to relay messages and/or data between devices 103 and service devices 105, via device 101. For example, each of devices 103 can transmit messages and/or data to service devices 105, when allowed by device 101, using respective services associated with service devices 105, including, but not limited to messages for forwarding onto another device 103, internet browser requests and the like. In turn, service devices 105 can transmit messages and/or data to devices 103 via device 101, including, but not limited to messages received from other devices 103.

It is yet further appreciated that system 100 can comprise any suitable number of relays similar to relays 102, for example in regional, national, and worldwide networks; indeed, when system 100 comprises a worldwide network of relays, a number of relays 102 can be large (e.g. thousands, hundreds of thousands and the like).

Service devices 105 each generally comprise a device enabled to provide a respective service to one or more of devices 103, including, but not limited to, a message service, an email service, a text message service, an internet browsing service and the like. For example, each of service devices 105 can comprise one or more of a message server, an email server, a text message server, an internet server, a proxy server and the like. Further some of service devices 105 can be redundant with other service devices: in other words, two or more service devices 105 can offer the same service to provide redundancy and load balancing in system 100.

It is yet further appreciated that system 100 can comprise any suitable number of service devices 105, for example in regional, national, and worldwide networks; indeed, when system 100 comprises a worldwide network of relays, a number of service device 105 can be large (e.g. thousands, hundreds of thousands, millions and the like).

Figure 10:
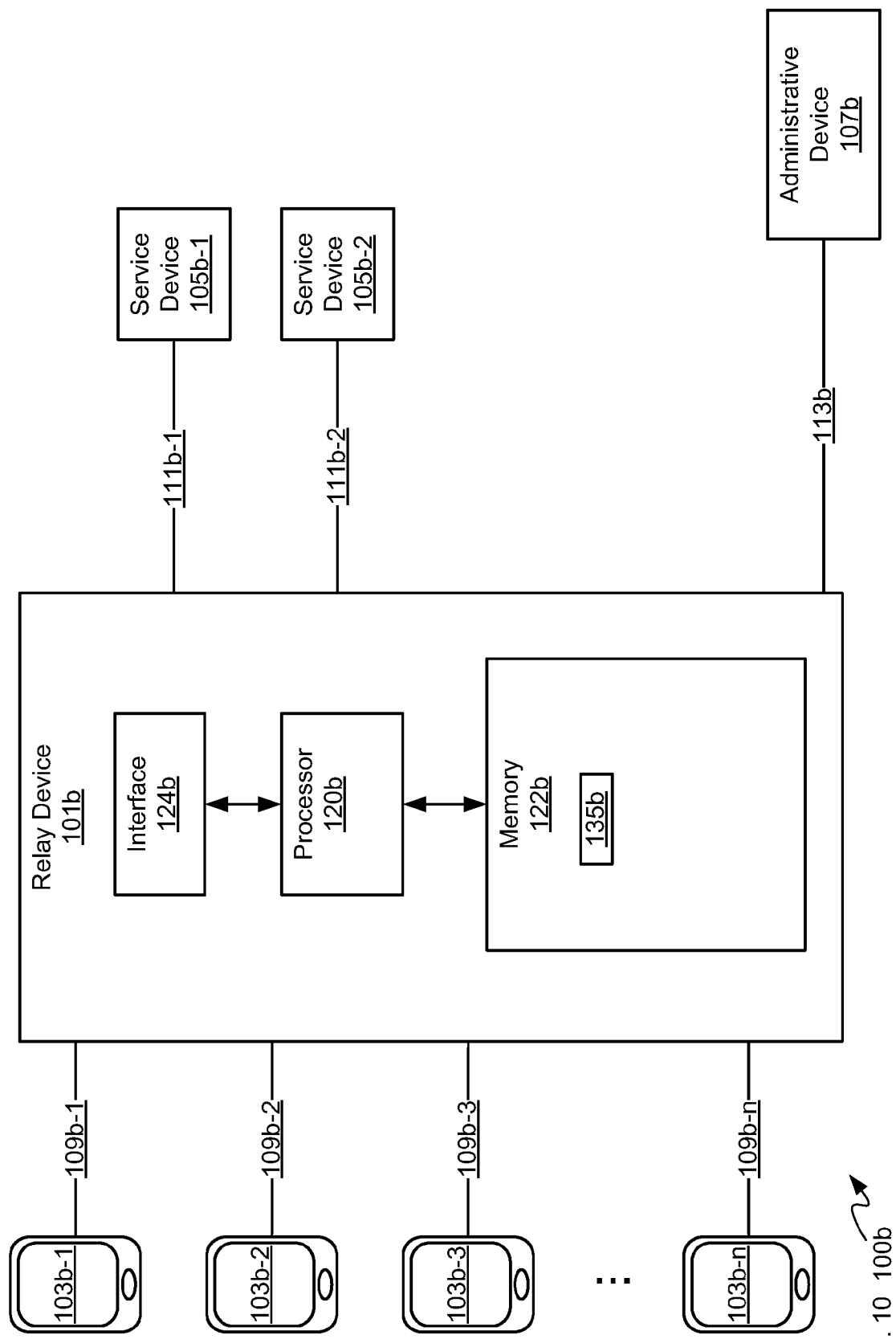
FIG. 10 depicts a system for managing load on service devices in a communication network, according to non-limiting implementations.

It is further appreciated that each relay 102 can be in communication with one or more service devices 105. For example, relay 102-1 is in communication with two service devices 105-1, 105-2, and hence relay 102-1 offers access to two services. While not depicted, some relays 102 may not be in communication with any service devices 105, but relay messages and/or data to other relays 102, which in turn relay messages and/or data to one or more service devices 105. Hence, in some implementations, messages and/or data in system 100 can be propagated by hopping between relays 102. However, in other implementations, device 101 and relays 102 in system 100 are in communication with all other relays 102 in system 100, hence messages and/or data can be propagated between device 101 and relays 102 in a single hop between device 101 and a relay 102 and/or a single hop between respective relays 102. In yet further implementations, device 101 is in communication with service devices 105 without intervention of a relay 102, for example see FIG. 10 described below.

Administrative device 107 can comprise a server, or the like, in communication with device 101, for monitoring and/or controlling device 101. For example, administrative device 107 can be enabled to request data regarding activity and/or volumes of messages queued at device 101 associated with service devices 105, and in turn cause device 101 to block access to service devices 105 and/or allow access to service devices 105.

Figure 2:
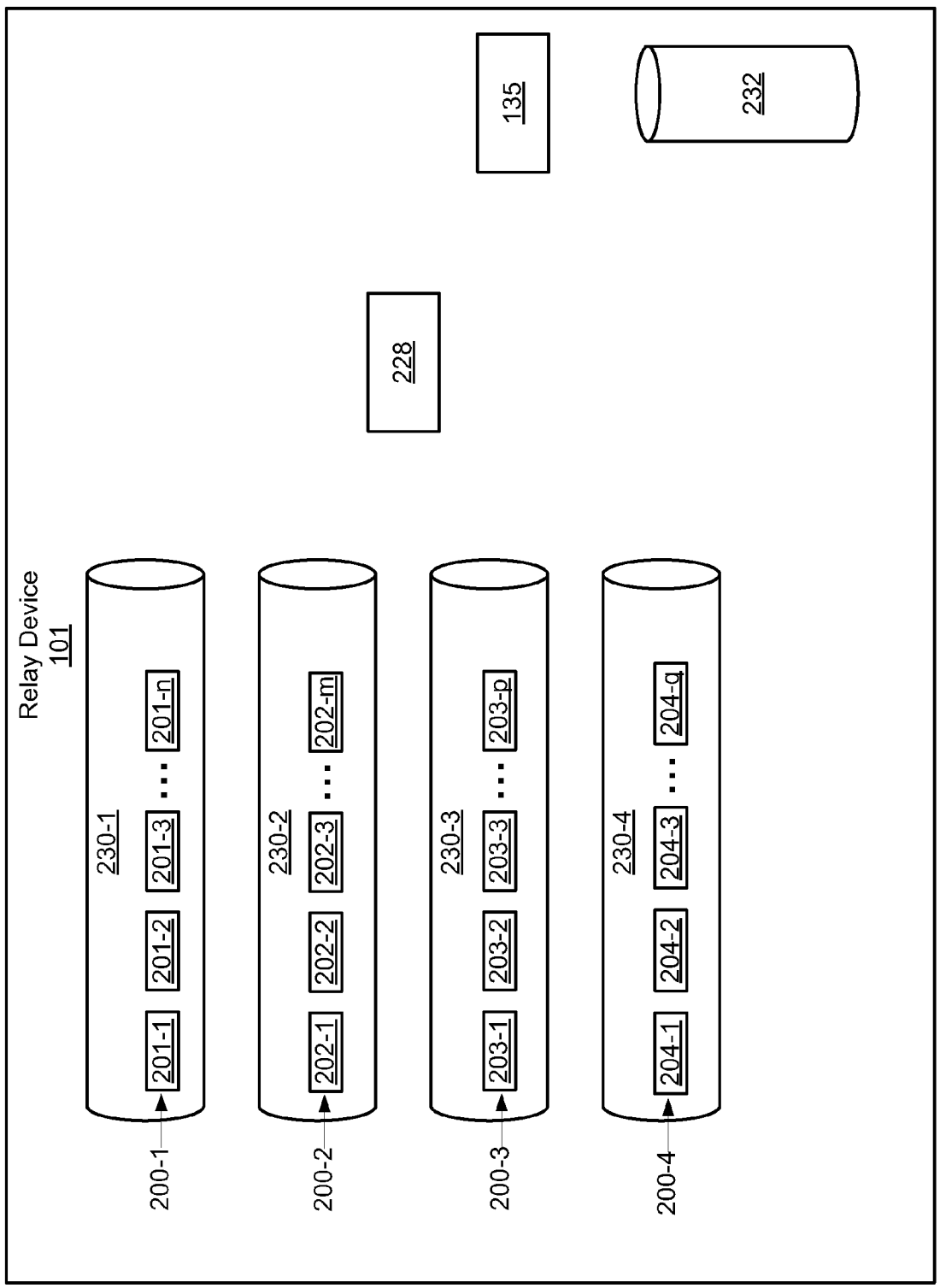
FIG. 2 depicts a schematic diagram of a relay device of the system of FIG. 1 showing elements related to relay processes, according to non-limiting implementations.

Attention is next directed to FIG. 2 which depicts a subset of elements of device 101, but it is appreciated that all elements of device 101 are nonetheless present. For example, while device 101 generally comprises a processor 120, memory 122 and interface 124, they are not depicted in FIG. 2, but are nonetheless appreciated to be present. Specifically, FIG. 2 provides a schematic diagram of device 101 showing elements related to relay processes: a relay manager 228, connection objects 230-1, 230-2, 230-3, 230-4 and a routing table 232. Connection objects 230-1, 230-2, 230-3, 230-4 will interchangeably be referred to hereafter collectively as connection objects 230 and generically as a connection object 230.

In any event, processor 120 is generally enabled to operate relay manager 228 for managing connection objects 230. Furthermore memory 122 stores a routing table 232 for storing associations between connection objects 230 and relays 102. For example: connection object 230-1 comprises a queue 200-1 of outbound messages 201-1, 201-2, 201-3 . . . 201-n to be transmitted to relay 102-1 received from other relays 102 and/or from devices 103 and/or from service devices 105; connection object 230-2 comprises a queue 200-2 of inbound messages 202-1, 202-2, 202-3 . . . 202-m received from relay 102-1 for relaying to other relays 102 and/or to devices 103 and/or to service devices 105; connection object 230-3 comprises a queue 200-3 of outbound messages 203-1, 203-3, 201-3 . . . 201-p to be transmitted to relay 102-2 received from other relays 102 and/or from devices 103 and/or from service devices 105; and connection object 230-4 comprises a queue 200-4 of inbound messages 204-1, 204-2, 204-3 . . . 204-q received from relay 102-2 for relaying to other relays 102 and/or to devices 103 and/or to service devices 105.

Queues 200-1, 200-2, 200-3 . . . 200-4 will interchangeably be referred to hereafter collectively as queues 200 and generically as a queue 200.

Messages 201-1, 201-2, 201-3 . . . 201-n will interchangeably be referred to hereafter collectively as messages 201 and generically as a message 201.

Messages 202-1, 202-2, 202-3 . . . 202-m will interchangeably be referred to hereafter collectively as messages 202 and generically as a message 202.

Messages 203-1, 203-3, 201-3 . . . 201-p will interchangeably be referred to hereafter collectively as messages 203 and generically as a message 203.

Messages 204-1, 204-2, 204-3 . . . 204-q will interchangeably be referred to hereafter collectively as messages 204 and generically as a message 204.

It is yet further appreciated that processor 120 can provide relay manager 228 and connection objects 230 by processing an application 135 stored at memory 122; for example, application 135 can comprise an application for relaying messages and managing relaying of messages. Hence processor 120 processes application 135 to operate relay manager 228 and connection objects 230.

Further, relay manager 228 is generally enabled to manage which messages 201, 202, 203, 204 are in each queue 200. For example, relay manager 228 can further move inbound messages 202, 204 to an outbound connection object 230-1, 230-3: in other words, relay manager 228 can further manage relaying of messages received from one relay 102-1, 101-3 to another relay 102-1, 101-3 and/or to service devices 105 and/or to device 103.

Further, messages 201 received at device 101 for relay to service devices 105-1, 105-2 are queued in connection object 230-1 for relay to relay 102-1 as routing table 232 stores data indicative that service devices 105-1, 105-2 are in communication with relay 102-1. Similarly, messages 203 received at device 101 for relay to service device 105-3 are queued in connection object 230-3 for relay to relay 102-2 as routing table 232 stores data indicative that service device 105-3 is in communication with relay 102-2.

Indeed, it is further appreciated that not all connection objects 230 are depicted in FIG. 2, and device 101 can comprise any suitable number of connection objects 230. For example, device 101 can comprise more than one connection object 230 for exchanging messages with each of relays 102. Further, device 101 can be in communication with relays other than relays 102, and hence, device 101 can comprise connection objects 230 for exchanging messages with each of the other relays with which device 101 is connected. Further, device 101 can comprise at least one connection object 230 for exchanging messages with each device 103, including, but not limited to, an inbound connection object associated with each device 103 and an outbound connection object associated with each device 103. Further, device 101 can comprise at least one connection object 230 for exchanging messages with administrative device 107, including, but not limited to, an inbound connection object associated with administrative device 107 and an outbound connection object associated with administrative device 107.

It is yet further appreciated that each connection object 230 can comprise and/or be connected to respective TCP/IP (Transmission Control Protocol/Internet Protocol) connections and/or ports at device 101. Alternatively, each connection object 230 can comprise and/or be connected to UDP (User Datagram Protocols) connections.

It is yet further appreciated that relay manager 228 and connection objects 230 can comprise one or more of hardware and software components. For example, logic for configuring relay manager 228 and/or connection objects 230 can be provided at applications 135, but each of relay manager 228 and connection objects 230 can further comprise at least a portion of one or more of processor 120, memory 122, and interface 124.

It is further appreciated that elements of device 101 described with reference to FIG. 2 are not to be considered particularly limiting. For example, while relay manager 228 and connection objects 230 are described with reference to device 101, in other implementations functionality of relay manager 228 and/or connection objects 230 can be distributed between other elements of device 101, and indeed, device 101 need not have specific elements that performs all the functionality of the described relay manager 228 and connection objects 230.

While not depicted, it is yet further appreciated that each relay 102 comprises respective processors, memories, interfaces, relay managers, or the like, connection objects, or the like, and routing tables for communicating with device 101, devices 103, other relays 102 and/or respective service devices 105. Indeed, at least the relay functionality of each relay 102 can be similar to the relay functionality of device 101.

It is yet further appreciated that each of device 101, relays 102, devices 103, service devices 105 and administrative device 107 can generally be remote from one another.

Attention is next directed back to FIG. 1, and components of system 100 will be described hereafter.

Each of device 101 and relays 102 can be any type of relay device and/or routing device and/or switching device that can be used to perform any suitable functions for relaying messages and/or data. Each of device 101 and relays 102 includes, but is not limited to, any suitable combination of communication devices, relay devices, routing devices, relay servers, routing servers, switches, switching devices and the like. Each of device 101 and relays 102 can be based on any well-known relay and/or router environment including a module that houses one or more central processing units, volatile memory (e.g. random access memory), persistent memory (e.g. hard disk devices) and network interfaces to allow device 101 and relays 102 to communicate over respective links 109, 111, 113. In some implementations, one or more of device 101 and relays 102 can comprise one or more of a router and a switch.

For example, each of device 101 and relays 102 can comprise a suitable relay device and/or routing device and/or switching device running a suitable operating system (e.g., UNIX, Linux, and the like), each of device 101 and relays 102 comprising one or more central processing units (including but not limited to processor 120 at device 101) random access memory (including but not limited to memory 122 at device 101, which can comprise any suitable combination of volatile and non-volatile memory). However, it is to be emphasized that a vast array of computing environments for each of device 101 and relays 102 are contemplated. It is furthermore appreciated that each of device 101 and relays 102 can comprise any suitable number of relay devices and/or routing devices and/or switching devices.

Each of devices 103 can be any type of electronic device that can be used in a self-contained manner. Devices 103 can include, but are not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Each device 103 can be based on any well-known computing environment including a module that houses one or more central processing units, volatile memory (e.g. random access memory), persistent memory (e.g. hard disk devices, flash memory devices) and network interfaces to allow each device 103 to communicate over a respective link 109.

Further, each device 103 can be associated with an account for which a given service can, in turn, be associated. For example, each device 103 can be enabled to interact with device 101 to access network infrastructure to communicate with service devices 105 for email messaging, text messaging, internet browsing and the like, and a respective subscriber associated with a device 103 can pay the entity for providing coverage of a device 103 via device 101 and/or for a given service associated with service devices 105.

Each of links 109, 111, 113 comprises any suitable link for respectively enabling device 101, relays 102, devices 103 and service devices 105 to communicate with each other. Links 109, 111, 113 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

It is appreciated that FIG. 1 further depicts a schematic diagram of device 101 according to non-limiting implementations. It should be emphasized that the structure of device 101 in FIG. 1 is purely an example, and contemplates a device enabled to control access of devices 103 to network infrastructure in system 100. However, while FIG. 1 contemplates device 101 enabled to control access of devices 103 to service devices 105, in other implementations, device 101 can comprise a device enabled for both controlling access of devices 103 to service devices 105 and providing services: for example, device 101 can both implement access functionality and provide services similar to service devices 105.

Processor 120 (which can be implemented as a plurality of processors, including but not limited to one or more central processors (CPUs)) is configured to communicate with each memory 122 comprising a respective non-volatile storage unit (e.g. Erasable Electronic Programmable Read Only Memory ("EEPROM"), Flash Memory) and a respective volatile storage unit (e.g. random access memory ("RAM")). Programming instructions that implement the functional teachings of device 101 as described herein are typically maintained, persistently, in memory 122 and used by processor 120 which makes appropriate utilization of respective volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 135 that, when processed by a processor 120, enables processor 120 to control access to network infrastructure in system 100. Further, as described in further detail below, processing of application 135 by processor 120 enables processor 120 to: determine that service devices 105 are available after being unavailable; and, in response, block incoming messages associated with a subset of service devices 105, the incoming messages from at least one communication device 103.

It is yet further appreciated that application 135 is an example of programming instructions stored at a memory 122.

Processor 120 also connects to interface 124, which can be implemented as one or more connectors and/or network adaptors and/or radios, configured to communicate with devices 103 and/or relays 102 and/or service devices 105 via respective links 109, 111, 113. In general, it will be appreciated that interface 124 is configured to correspond with the network architecture that is used to implement respective links 109, 111, 113 as described above. In other implementations a plurality of links with different protocols can be employed at each relay 102 and thus a respective interface 124 can comprise a plurality of interfaces to support each type of respective link. In any event, it is appreciated that any suitable combination of interfaces is within the scope of present implementations.

It is yet further appreciated that: at device 101, each of connection objects 230 receives and/or transmits messages via interface 124.

Further, it should be understood that in general a wide variety of configurations for device 101 are contemplated.

It is yet further appreciated that each of service devices 105 can comprise relay functionality as well as service functionality and can be similar, at least in part to one or more of device 101 and/or relays 102, and hence comprises at least a respective processor, a respective communication interface and a respective memory, the respective processor for carrying out processing instructions stored at the respective memory to provide the functionality of service devices 105.

It is yet further appreciated that each of service devices 105 and administrative device 107 can comprise a Sun Fire V480 (configured as a routing device and running a UNIX operating system, from Oracle America, Inc. of Redwood City, Calif.), and having four central processing units each operating at about nine-hundred megahertz and having about sixteen gigabytes of random access memory. However, it is to be emphasized that this particular server is merely an example, and a vast array of other types of computing environments for each of service devices 105 and administrative device 107 are contemplated. It is further more appreciated that each of service devices 105 and administrative device 107 can comprise any suitable number of servers.

Figure 3:
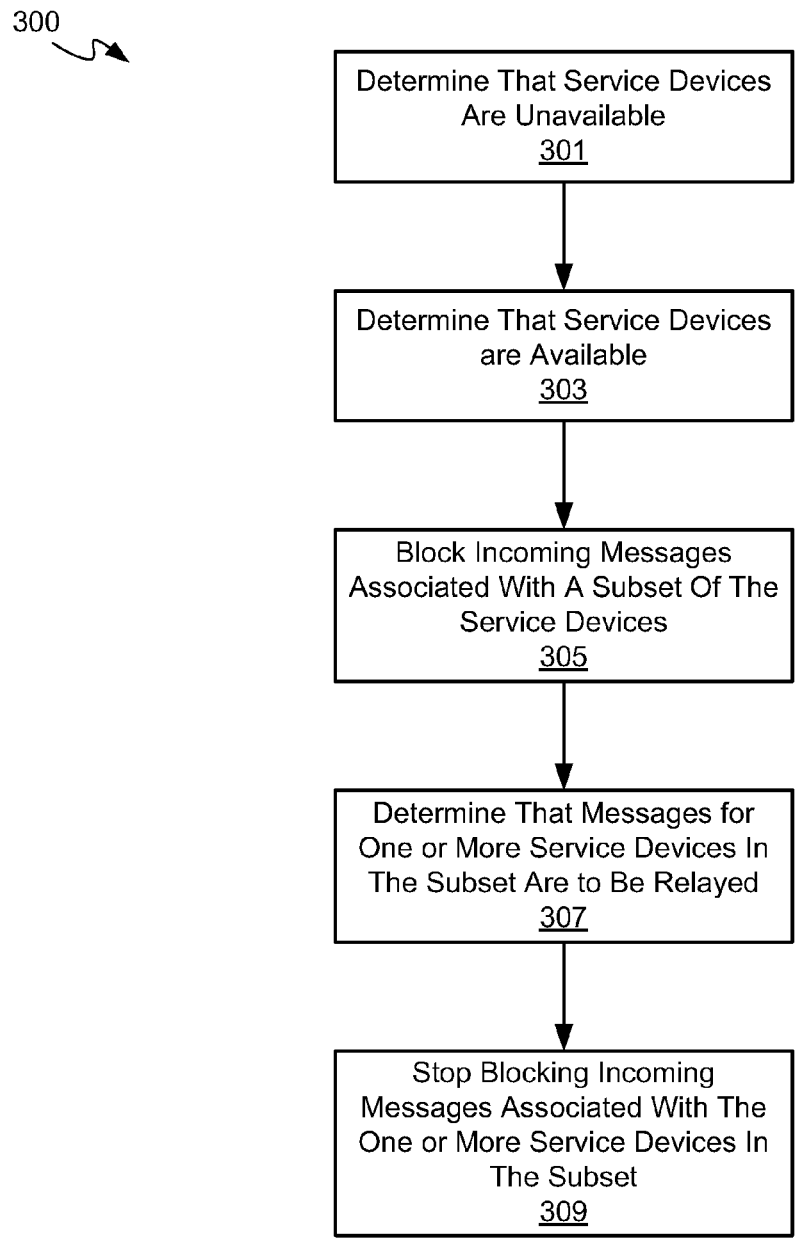
FIG. 3 depicts a flowchart of a method for managing load on service devices in the system of FIG. 1, according to non-limiting implementations.

Attention is now directed to FIG. 3 which depicts a flowchart of a method 300 for managing load on service devices in a communication network, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that, in some implementations, method 300 is implemented in system 100 by processor 120 of device 101. Indeed, method 300 is one way in which device 101 can be configured. It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

Figure 4:
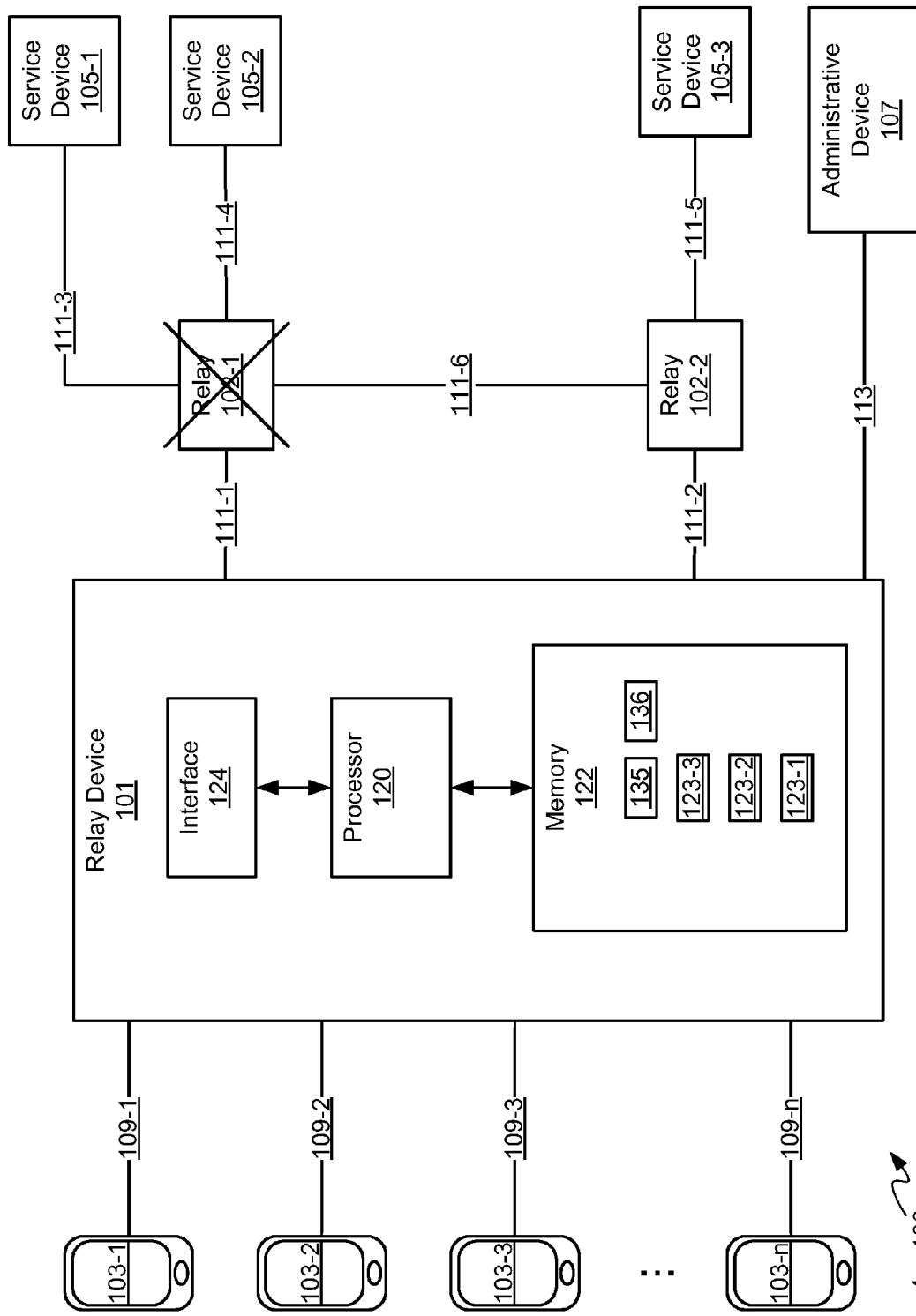
FIG. 4 depicts the system of FIG. 1 with loss of availability of a subset of service devices due to an associated relay going offline, according to non-limiting implementations.

Further, method 300 is described with reference to FIGS. 4, 5 and 7, each of which is similar to FIG. 1, with like elements having like numbers.

At block 301, processor 120 determines that service devices 105-1, 105-2 are unavailable. For example, with reference to FIG. 4, relay 102-1 can go offline and hence is not available to relay messages and/or data to service devices 105-1, 105-2. For example, relay 102-1 can go offline for maintenance and/or when relay 102-1 undergoes a cold start, and/or restart, to reset relay 102-1 and the like. Similarly, link 111-1 can be lost when relay 102-1 goes offline. Processor 120-1 can determine that services are unavailable when communications with relay 102-1 are lost and/or link 111-1 is lost.

Further, while relay 102-1 is offline and services 105-1, 105-2 are unavailable, processor 120 continues to queue messages 201 for relay to relay 102-1 and/or services 105-1, 105-2. Similarly, service devices 105-1, 105-2 continue to accumulate messages and/or data for transmission to relay 102-1. For example, requests for data can have been received at service devices 105-1, 105-2 prior to relay 102-1 going offline; hence, while relay 102-1 is offline, service devices 105-1, 105-2 can generate responses and/or receive messages from other devices from other communication networks for relay to devices 103.

In further implementations (not depicted), one or more of services 105-1, 105-2 can become unavailable due to one or more of: at least one of links 111-1, 111-3, 111-4 can be lost; and at least one of service devices 105-1, 105-2 can go offline for reasons similar to relay 102-1 going offline, as described above.

In yet further implementations, when service devices 105-1, 105-2 are unavailable, device 101 can: refuse messages and/or data from devices 103 associated with service devices 105-1, 105-2; and/or transmit indications to devices 103 that services associated with service devices 105-1, 105-2 are presently unavailable. Either way, messages and/or data to be transmitted to service devices 105-1, 105-2 accumulate at devices 103 for later transmission to service devices 105-1, 105-2 (i.e. when services associated with service devices 105-1, 105-2 again available).

Figure 5:
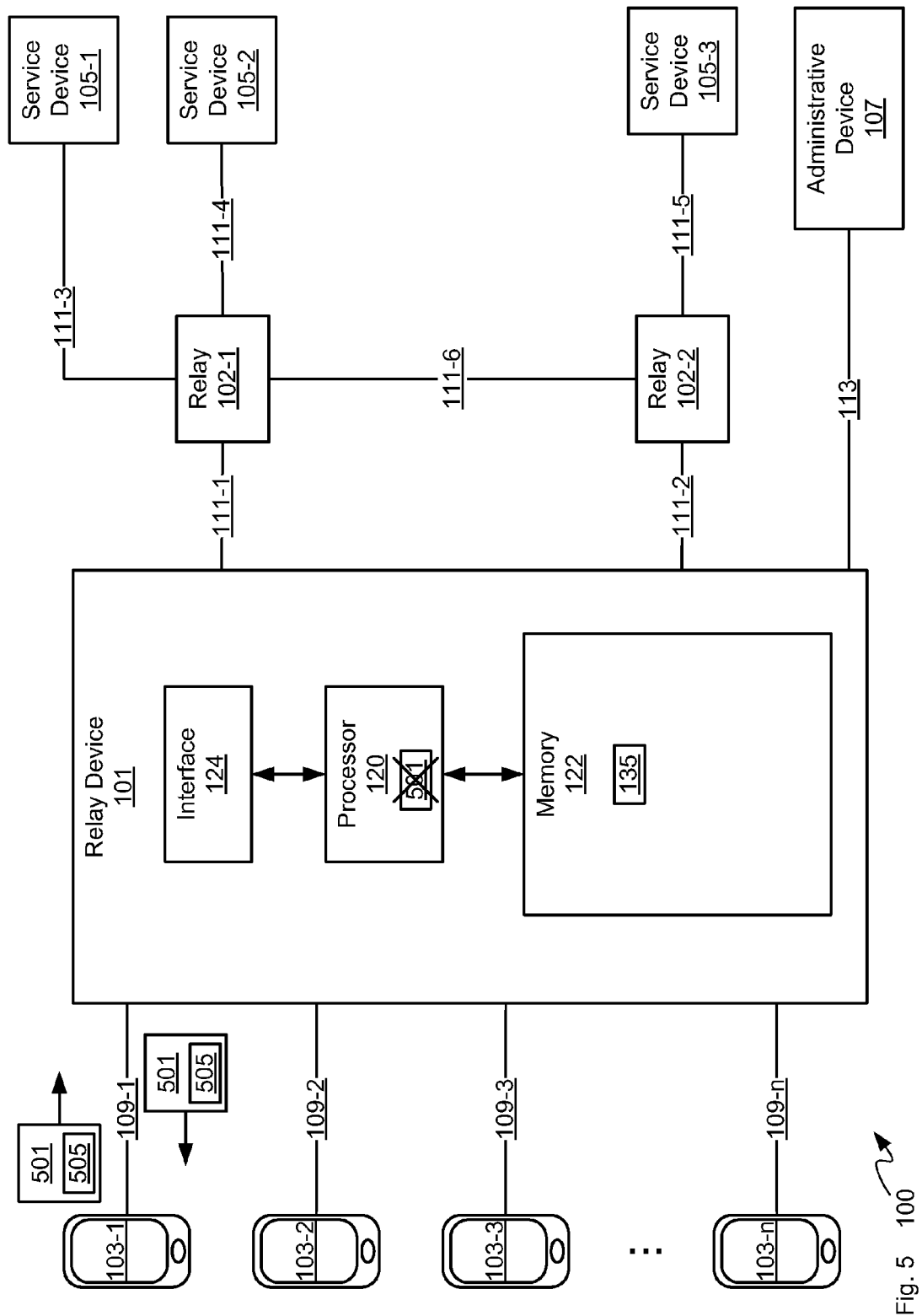
FIG. 5 depicts the system of FIG. 1 with incoming messages for a subset of services devices being blocked from communication devices after the relay comes back online, according to non-limiting implementations.

In any event, at a later time, as depicted in FIG. 5, service devices 105-1, 105-2 become available, and at block 303 of method 300, processor 120 determines that service devices 105-1, 105-2 are available after being unavailable. For example, processor 120 can determine that communication with relay 102-1 has been re-established, and/or that link 111-1 has been re-established, and optionally ping one or more of relay 102-1 and service devices 105-1, 105-2 to determine that service devices 105-1, 105-2 are again available. As such, device 101 can then indicate to devices 103 via links 109 that services associated with service devices 105-1, 105-2 are again available. In response, devices 103 can then transmit any messages and/or data, associated with services provided by service devices 105-1, 105-2, that have accumulated at devices 103, to device 101 for relay to service devices 105-1, 105-2.

However, at block 305, processor 120 blocks incoming messages associated with a subset of service devices 105, the incoming messages from devices 103. In depicted implementations, the subset of service devices 105 that are blocked comprises service devices 105-1, 105-2 as these are the services devices that were previously unavailable. In general, incoming messages to service devices 105-1, 105-2 are blocked to prevent strain on relay 102-1 and/or on each of service devices 105-1, 105-2 in the subset when relay 102-1 comes back on-line.

It is yet further appreciated that, at block 305, processor 120 blocks incoming messages associated with a subset of service devices 105 temporarily, and/or until strain on one or more of relay 102-1 and the subset service devices 105-1, 105-2 is reduced, and/or until relaying the incoming messages would not create strain on one or more of relay 102-1 and the subset service devices 105-1, 105-2, as will be described hereafter.

For example, attention is again directed to FIG. 5 where device 103-1 transmits a message 501 to device 101, message 501 associated with a service provided by one of service devices 105-1, 105-2. However, rather than relay message 501 to relay 102-1 (e.g. queue message 501 in queue 200-1), device 101 blocks message 501 by one or more of: dropping message 501 (as depicted at processor 120); transmitting message 501 back to device 103-1; acknowledging receipt of message 501; and sending a notification back to device 103-1 that message 501 has been rejected.

Figure 6:
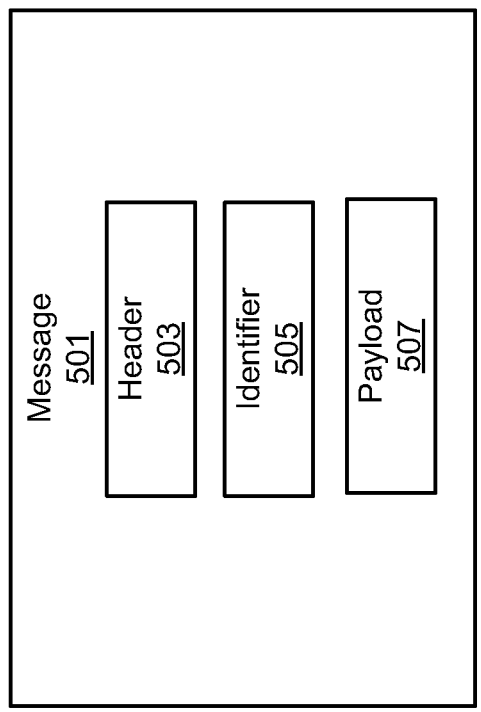
FIG. 6 depicts a format of a message transmitted in the system of FIG. 1, according to non-limiting implementations.

Device 101 can identify message 501 as being associated with a service provided by one of service devices 105-1, 105-2 via an identifier 505. Indeed, attention is next directed to FIG. 6 which depicts a non-limiting format of messages 601 transmitted by devices 103 in association with a service provided by one or more of service devices 105, 106. Message 601 can be generated by an associated client at device 103-1. Message 601 can comprise a header 603, an identifier 605 and a payload 607. Each of messages 201, 202, 203, 204, 501 can comprise the format of message 601; in any event, each of messages 201, 202, 203, 204, 501 comprises an identifier similar to identifier 605. For example, identifier 505 is similar to identifier 605.

Header 603 can comprise any suitable data for routing message 601 to relay 102-1, including, but not limited, internet protocol (IP) data, an identifier of a destination device, and identifier of device 103-1 and the like.

Identifier 605 comprises an identifier associated with a service provided by one of service devices 105-1, 105-2. In general, identifier 605 enables relay 102-1 to relay message 601 to relay 102-1, which in turn relays message 601 to one of service devices 105-1, 105-2, depending on the service identified by identifier 605. For example, message 601 is generated by a client associated with a service provided by one of service devices 105-1, 105-2, and hence the client can be provisioned with identifier 605 and further provide identifier 605 when message 601 is generated by the client.

Processor 120 at device 101 can determine that an incoming message 501, 601 is associated with subset of service devices 105-1, 105-1 via the respective identifiers 505, 605.

Payload 607 comprises data to be delivered to one or more of a destination device and a service device 105-1, 105-2 associated with message 601, including, but not limited to, message data, text data, a browser request and the like.

Returning to FIG. 3, at block 307 processor determines that incoming messages for one or service devices 105-1, 105-2 in the subset are to be relayed to one or more of relay 102-1, and service devices 105-1, 105-2 and, in response at block 309, stop blocking incoming messages associated with one or more of the subset of service devices 105-1, 105-2.

Figure 7:
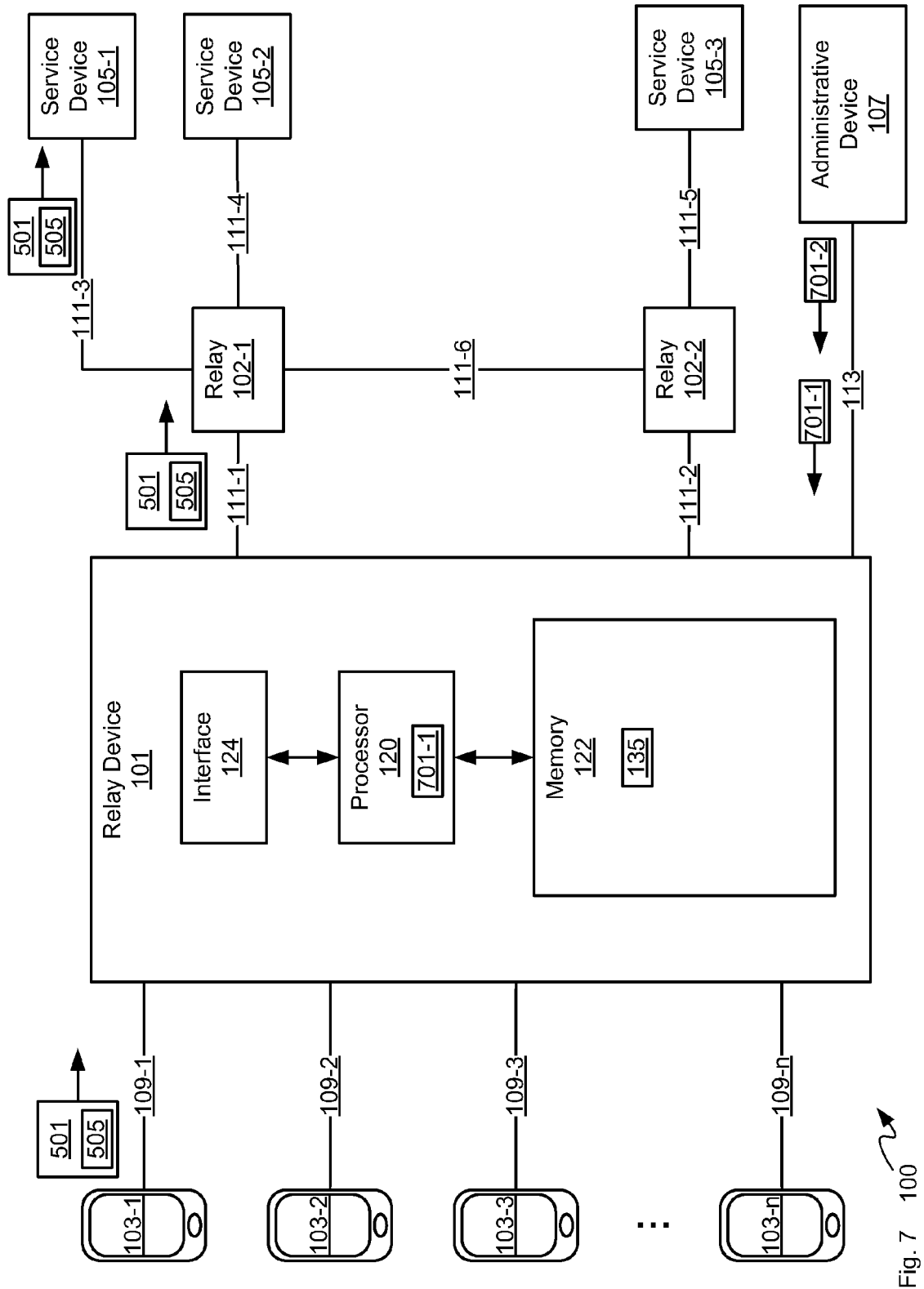
FIG. 7 depicts the system of FIG. 1 with incoming messages for a subset of services devices being unblocked after receiving an indication from an administrative device, according to non-limiting implementations.

For example, with reference to FIG. 7, device 101 can receive one or more indications 701-1, 701-2 to relay messages associated with the one or more of the subset of service devices 105-1, 105-2, indications 701-1, 701-2 received from administrative device 107. In other words, administrative device 107 can monitor traffic and/or bandwidth and/or messages 201 at device 101 and determine when traffic and/or bandwidth and/or messages 201 at device 101 is of a respective value that relay 102-1 and/or service devices 105-1, 105-2 will no longer be overwhelmed and/or subjected to strain when new incoming messages from devices 103 are relayed to relay 102-1. For example, a volume of messages 201 at device 101 can meet a threshold condition, such as falling below a threshold value, as device 101 relays messages 201 in queue 200-1 to relay 102-1.

In some implementations, administrative device 107 transmits a single indication to device 101 that causes device 101 to stop blocking all incoming messages from devices 103 for services associated with all service devices 105-1, 105-2 in the subset.

However, in depicted implementations, each indication 701-1, 701-2 is respectively associated with service devices 105-1, 105-2. Hence, indication 701-1 indicates that incoming messages associated with a service provided by service device 105-1 are to be relayed; and indication 701-2 indicates that incoming messages associated with a service provided by service device 105-2 are to be relayed. As each indication 701-1, 701-2 can be transmitted independent of each other, messages for each of service devices 105-1, 105-2 in the subset can be unblocked independent of each other.

For example, administrative device 107 can monitor device 101 and when messages 201 for service device 107-1 meet a respective threshold condition (e.g. fall below a threshold value), indication 701-1 can be transmitted; similarly, when messages 201 for service device 107-2 meet a respective threshold condition (e.g. fall below a threshold condition), indication 701-2 can be transmitted.

Further, the order in which indications 701-1, 701-2 are transmitted, and/or received at device 101, is dependent only on when administrative device 107 makes a determination that messages for respective service devices 105-1, 105-2 are to be unblocked. Hence, messages for service device 105-2 can be unblocked before messages for service device 105-1.

In some implementations indications 701-1, 701-2 are generated when administrative device 107 receives respective input data to generate each of indications 701-1, 701-2, for example via an administrator of system 100 interacting with the input device.

Regardless, processor 120 can be further enabled to stop blocking the incoming messages associated with one or more of the subset of service devices 105-1, 105-2 after receiving a plurality of indications 701-1 701-2 to relay messages respectively associated with the each of service devices 105-1, 105-2 in the subset, the plurality of indications 701-1, 701-2 received one after the other from administrative device 107.

For example, and with further reference to FIG. 7, once indication 701-1 is received at device 101, and device 103 attempts to resend message 501, message 501 is relayed to relay 102-1, which in turn relays message 501 to service device 105-1 for processing.

In some implementations, however, processor 120 is further enabled to stop blocking the incoming messages associated with one or more of the subset of services devices 105-1, 105-2 in a priority order of the subset of service devices 105-1, 105-2. For example, service device 105-2 can be providing a service that is considered a higher priority in system 100, for example due to a higher associated cost or the like, and or a critical nature of the provided service. Hence, processor 120 can be enabled to stop blocking messages for service device 105-2 before processor 120 stops blocking messages for service device 105-1, regardless of which indication 701-1, 701-2 is first received. In other words, when indication 701-1 is received first, processor 120 waits until indication 701-2 is received and messages for service device 105-2 are unblocked before unblocking messages for service device 105-1.

In yet further implementations, administrative device 107 can determine a priority order of services provided by service devices 105-1, 105-2, and transmit indications 701-1, 701-2 in the priority order.

Persons skilled in the art will appreciate that there are yet more alternative implementations and modifications possible. For example, attention is next directed to FIG. 8, which depicts a system 100a that is substantially similar to system 100 with like elements having like numbers, but with an "a" appended thereto, however system 100a is lacking an administrative device similar to administrative device 107, and an associated link similar to link 113. Hence system 100a comprises: a device 101a, relays 102a-1, 102a-2, communication devices 103a-1, 103a-2, 103a-3 . . . 103a-n, and service devices 105a-1, 105a-2, 105a-3. Relays 102a-1, 102a-2 will interchangeably be referred to hereafter, collectively, as relays 102a and generically as a relay 102a. Communications devices 103a-1, 103a-2, 103a-3 . . . 103a-n will be interchangeably referred to hereafter, collectively as devices 103a, and generically as a device 103a. Service devices 105a-1, 105a-2, 105a-3 will be interchangeably referred to hereafter as, collectively, as service devices 105a, and generically as a service device 105a. It is yet further appreciated that device 101a can establish communications with each device 103a via a respective link 109a-1, 109a-2, 109a-3 . . . 109a-n (which will interchangeably be referred to hereafter, collectively, as links 109a and generically as a link 109a). Device 101a, relays 102a and service devices 105a are all in communication via respective links 111a-1, 111a-2, 111a-3, 111a-4, 111a-5, 111a-6 (which will interchangeably be referred to hereafter, collectively, as links 111a and generically as a link 111a). Device 101a further comprises a processor 120a interconnected with a memory 122a and a communication interface 124a, interchangeably be referred to hereafter as an interface 124. Memory 122 further stores an application 135a similar to application 135.

However, memory 122a further stores threshold conditions 801-1, 801-2, 801-3 associated respectively associated with services devices 105a-1, 105a-2, 105a-3, each of threshold conditions 801-1, 801-2, 801-3 are indicative of a volume and/or number of messages associated with each of services devices 105a-1, 105a-2, 105a-3 below which a number messages associated with a given service device 105a is to fall before unblocking respective incoming messages.

Figure 8:
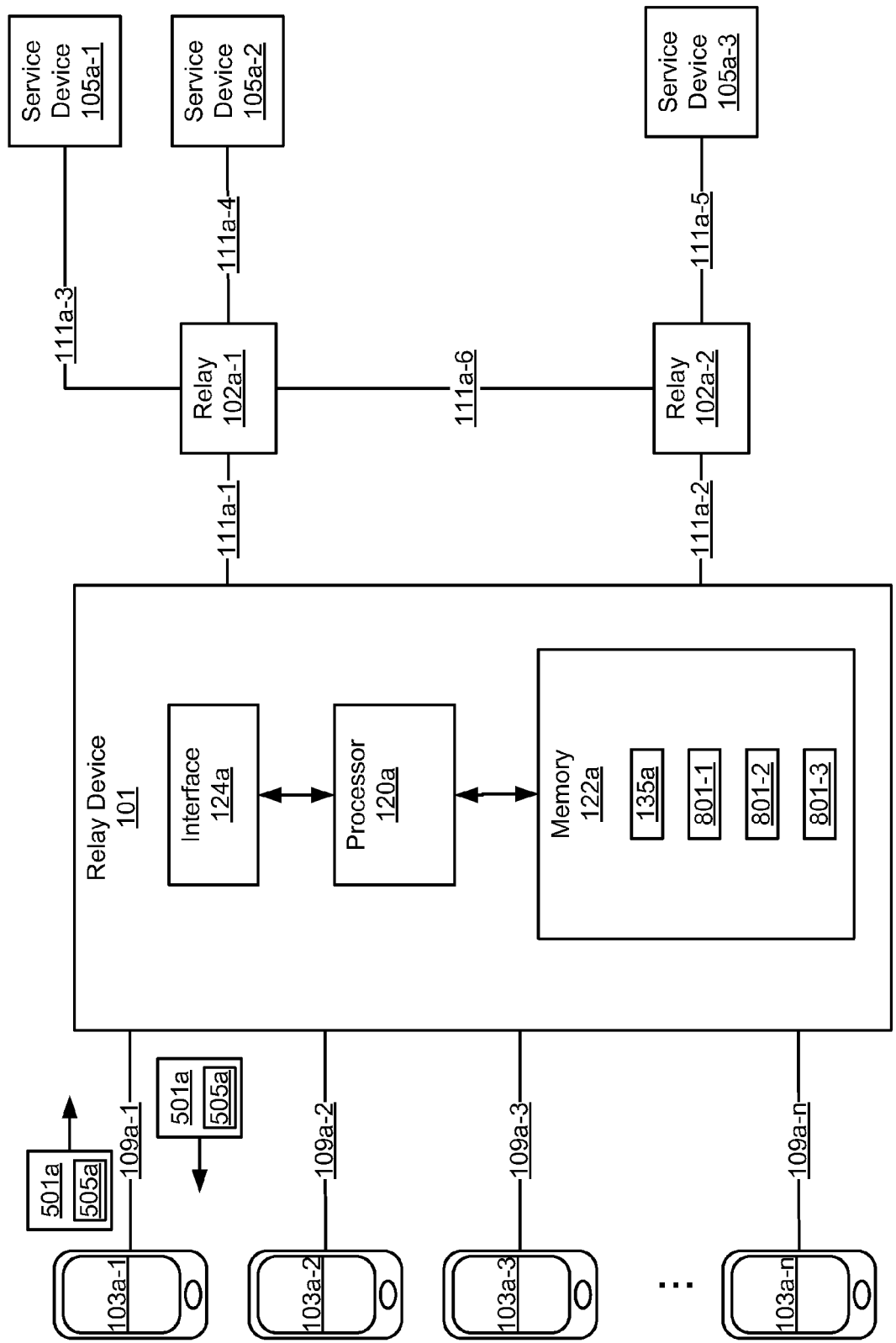
FIG. 8 depicts a system for managing load on service devices in a communication network with incoming messages for a subset of services devices being blocked from communication devices, according to non-limiting implementations.

For example, it is assumed in FIG. 8 that service devices 105a-1, 105a-2 were previously unavailable, but are again available, similar to the implementation described above with respect to FIGS. 4 and 5, and processor 120a is hence blocking messages for each of service devices 105a-1, 105a-2. Hence, a message 501a for service device 105a-1 from device 103a-1 is blocked, message 501a comprising an identifier 505a similar to identifier 505.

Figure 9:
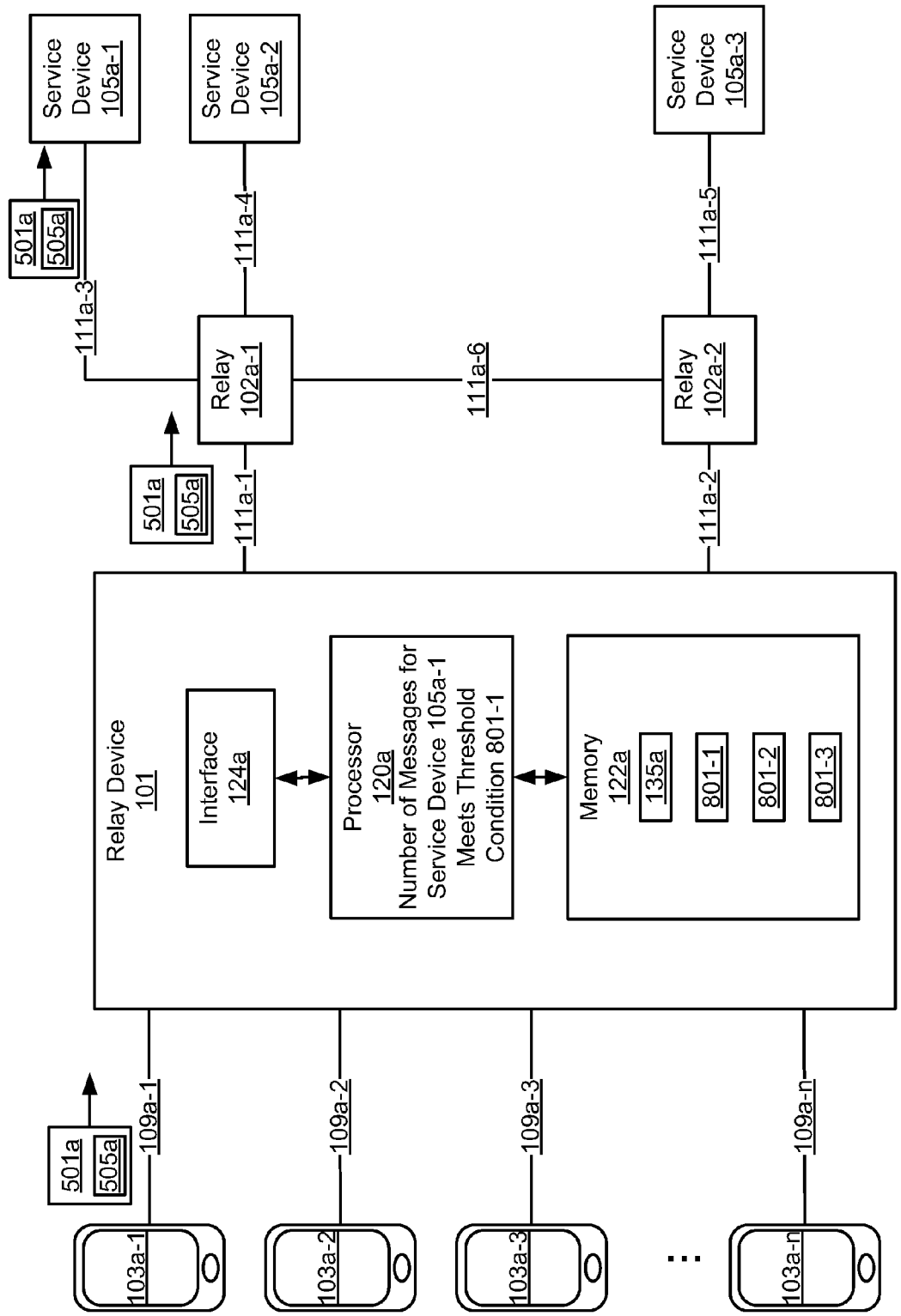
FIG. 9 depicts the system of FIG. 8 with incoming messages for a subset of services devices being unblocked after a threshold condition is met, according to non-limiting implementations.

However, processor 120a also monitors a number of messages at device 101a for relay to service device 105a-1 (e.g. a number of messages for service device 105a-1 in queue for relay to relay 102a-1). As depicted in FIG. 9 (substantially similar to FIG. 8, with like elements having like numbers), when the number of messages for relay to service device 105a-1 meets threshold conditions 801-1 (e.g. meets and/or falls below a respective threshold value), processor 120a-1 stops blocking messages for service device 105a-1; hence, when device 103-1 again transmits message 501a, message 501a is relayed by device 101a to relay 102a-1, which in turn relays message 501a to service device 105a-1.

Device 101a further monitors a number of messages at device 101a for relay to service device 105a-2 (e.g. a number of messages for service device 105a-2 in queue for relay to relay 102a-1). Hence, when the number of messages for relay to service device 105a-2 meets threshold condition 801-2 (e.g. meets and/or falls below a respective threshold value), processor 120a-1 stops blocking messages for service device 105a-2.

It is further appreciated that threshold value 801-3 is stored in the event that service device 105a-3 becomes unavailable, for example due to relay 102a-2 going offline; when service device 105a-3 again becomes available (e.g. relay 102a-2 comes back online), processor 120a blocks incoming messages from devices 103a that are associated with a service provided by service device 105a-3, and processor 120a further monitors a number of messages at device 101a for relay to service device 105a-3 (e.g. a number of messages for service device 105a-3 in queue for relay to relay 102a-3). Hence, when the number of messages for relay to service device 105a-3 meets threshold condition 801-3 (e.g. a number of messages for service device 105a-3 in queue for relay to relay 102a-2), processor 120-1 stops blocking messages for service device 105-3.

Persons skilled in the art will appreciate that there are yet more alternative implementations and modifications possible. For example attention is next directed to FIG. 10, which depicts a system 100b that is substantially similar to system 100 of FIG. 1, with like elements having like numbers, but a "b" appended thereto. System 100b hence comprises a relay device 101b, a plurality of communication devices 103b-1, 103b-2, 103b-3 . . . 103b-n (referred to hereafter collectively as devices 103b and generically as a device 103b), service devices 105b-1, 105b-2, and an administrative device 107b according to non-limiting implementations. Relay device 101b can establish communications with each communication device 109b via a respective link 109b-1, 109b-2, 109b-3 . . . 109b-n (referred to hereafter collectively as links 109b and generically as a link 109b). Relay device 101b is in communication with service devices 105b-1, 105b-2 via respective links 111b-1, 111b-2. Relay device 101b further comprises a processor 120b interconnected with a memory 122b and a communication interface 124b. Memory 122a further stores an application 135b, similar to application 135. While not depicted relay device 101b can further comprise connection objects, a relay manager and a routing table, as described above. In any event, system 100b is similar to system 100 but without other relays intervening between relay device 101b and service devices 105b. Otherwise method 300 can be implemented at relay device 101b to block incoming messages associated with a subset of service devices 105b-1, 105b-2, the incoming messages from the at least one communication device 103b. However, in this implementation, the subset can be determined when one or more of services devices 105b-1, 105b-2 become available after being unavailable.

In any event, by generally temporarily blocking incoming messages for service devices at a front end device, when the service devices become available, after a period of unavailability, strain on an associated relay decreased, which could include relay devices 101, 101a, 101b, and the risk of the associated relay failing due to such strain is also decreased. Hence, methods described herein provide a soft-start for relays and/or service devices in systems 100, 100a, 100b that temporarily go offline.

Those skilled in the art will appreciate that in some implementations, the functionality of devices 101, 101a, 101b can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, 101b can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay device comprising:
  a communication interface and a processor for relaying messages, via the communication interface, between a communication device and service devices, the processor enabled to:
    determine that the service devices are available after being unavailable; and, in response,
    block incoming messages associated with a subset of the service devices, the incoming messages from the communication device; and
    after the incoming messages are blocked:
      stop blocking respective incoming messages associated with a given service device of the subset of service devices when a volume of messages associated with the given service device falls below a threshold value;
      stop blocking the incoming messages associated with one or more of the subset of service devices after receiving a plurality of indications to relay messages respectively associated with the each of the service devices in the subset, the plurality of indications received one after the other from an administrative device; and,
      relay the incoming messages associated with one or more of the subset of service devices for receipt by the one or more of the subset of service devices based on a priority order of the subset of service devices such that the incoming messages are relayed to a service device of the subset of the service devices having a higher priority before being relayed to another service device of the subset of service devices having a lower priority.

2. The relay device of claim 1, wherein the processor is further enabled to block incoming messages associated with the subset of the service devices by one or more of:
  dropping the incoming messages;
  transmitting the incoming messages back to the communication device acknowledging receipt of the incoming messages; and,
  sending respective notifications back to the communication device that the incoming messages have been rejected.

3. The relay device of claim 1, wherein each of the incoming messages comprises a respective identifier associated with a respective service provided by one or more of the service devices, and wherein the processor is further enabled to determine that the incoming messages are associated with the subset via the respective identifiers.

4. The relay device of claim 1, further comprising at least one of a router, a relay, a switch and a firewall.

5. A method comprising:
  determining, at a processor of a relay device, that the service devices are available after being unavailable, the relay device comprising a communication interface and the processor for relaying messages, via the communication interface, between a communication device and the service devices; and, in response,
  blocking, via the processor, incoming messages associated with a subset of the service devices, the incoming messages from the communication device; and
  after the incoming messages are blocked:
    stop blocking respective incoming messages associated with a given service device of the subset of service devices when a volume of messages associated with the given service device falls below a threshold value;
    stop blocking the incoming messages associated with one or more of the subset of service devices after receiving a plurality of indications to relay messages respectively associated with the each of the service devices in the subset, the plurality of indications received one after the other from an administrative device; and,
    relaying the incoming messages associated with one or more of the subset of service devices for receipt by the one or more of the subset of service devices based on a priority order of the subset of service devices such that the incoming messages are relayed to a service device of the subset of the service devices having a higher priority before being relayed to another service device of the subset of service devices having a lower priority.

6. The method of claim 5, further comprising blocking incoming messages associated with the subset of the service devices by one or more of:
  dropping the incoming messages;
  transmitting the incoming messages back to the communication device acknowledging receipt of the incoming messages; and,
  sending respective notifications back to the communication devices that the incoming messages have been rejected.

7. The method of claim 5, wherein each of the incoming messages comprises a respective identifier associated with a respective service provided by one or more of the service devices, and wherein the method further comprises determining that the incoming messages are associated with the subset via the respective identifiers.

8. A non-transitory computer program product, comprising a non-transitory computer usable medium having a computer readable program code adapted to be executed to implement a method comprising:
  determining, at a processor of a relay device, that the service devices are available after being unavailable, the relay device comprising a communication interface and a processor for relaying messages, via the communication interface, between a communication device and the service devices; and, in response, blocking incoming messages associated with a subset of the service devices, the incoming messages from the at least one communication device; and after the incoming messages are blocked:
- stop blocking respective incoming messages associated with a given service device of the subset of service devices when a volume of messages associated with the given service device falls below a threshold value;
- stop blocking the incoming messages associated with one or more of the subset of service devices after receiving a plurality of indications to relay messages respectively associated with the each of the service devices in the subset, the plurality of indications received one after the other from an administrative device; and,
- relaying the incoming messages associated with one or more of the subset of service devices for receipt by the one or more of the subset of service devices based on a priority order of the subset of service devices such that the incoming messages are relayed to a service device of the subset of the service devices having a higher priority before being relayed to another service device of the subset of service devices having a lower priority.

9. The non-transitory computer program product of claim 8, wherein the method further comprises blocking incoming messages associated with the subset of the service devices by one or more of:
- dropping the incoming messages;
- transmitting the incoming messages back to the communication device acknowledging receipt of the incoming messages; and,
- sending respective notifications back to the communication devices that the incoming messages have been rejected.

10. The non-transitory computer program product of claim 8, wherein each of the incoming messages comprises a respective identifier associated with a respective service provided by one or more of the service devices, and wherein the method further comprises determining that the incoming messages are associated with the subset via the respective identifiers.

\* \* \* \* \*